US007353211B2

(12) United States Patent
Hans et al.

(10) Patent No.: US 7,353,211 B2
(45) Date of Patent: Apr. 1, 2008

(54) METHOD FOR ENCRYPTING DATA AND A TELECOMMUNICATIONS TERMINAL AND ACCESS AUTHORIZATION CARD

(75) Inventors: Martin Hans, Hildesheim (DE); Frank Kowalewski, Salzgitter (DE); Josef Laumen, Hildesheim (DE); Gunnar Schmidt, Wolfenbuettel (DE); Siegfried Baer, Pforzheim (DE); Mark Beckmann, Braunschweig (DE); Wael Adi, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 895 days.

(21) Appl. No.: 10/148,943

(22) PCT Filed: Dec. 1, 2000

(86) PCT No.: PCT/DE00/04278

§ 371 (c)(1),
(2), (4) Date: Nov. 13, 2002

(87) PCT Pub. No.: WO01/43471

PCT Pub. Date: Jun. 14, 2001

(65) Prior Publication Data

US 2003/0097341 A1   May 22, 2003

(30) Foreign Application Priority Data

Dec. 7, 1999  (DE)  ................ 199 58 749
Apr. 7, 2000  (DE)  ................ 100 17 424

(51) Int. Cl.
*G06Q 99/00*  (2006.01)
(52) U.S. Cl. ............... 705/67; 705/50; 705/51; 705/57; 705/59; 705/65; 726/2; 726/26; 726/28; 726/30; 713/150; 713/165; 713/169; 713/182; 380/200; 380/201; 380/202; 380/203

(58) Field of Classification Search ................ 713/150, 713/165, 169, 182–186; 705/50–79; 380/200–203, 380/255, 277, 278–279; 726/2–7, 26–33
See application file for complete search history.

(56) References Cited

U.S. PATENT DOCUMENTS

| 5,036,461 A | 7/1991 | Elliot et al. |
| 6,055,314 A * | 4/2000 | Spies et al. ............ 380/228 |
| 6,142,369 A | 11/2000 | Jonstromer |
| 6,697,944 B1 * | 2/2004 | Jones et al. ............ 713/168 |

FOREIGN PATENT DOCUMENTS

| EP | 0 644 513 | 3/1995 |
| GB | 2227111 A * | 7/1990 |
| WO | WO99/39524 | 8/1999 |

OTHER PUBLICATIONS

J. Eberspächer et al. "GSM Global System for Mobile Communication," Stuttgart, 1997.
"Radio Interface Protocol Architecture," 3GPP TSG RAN WG2, TS25.301 v. 3.1.0, 1999.
"Specification of SIM Application Toolkit for the Subscriber Identity Module—Mobile Equipment (SIM-ME) Interface," GSM 11.14 version 8.0.1 release 1999, ETSI.

* cited by examiner

*Primary Examiner*—Jalatee Worjloh
(74) *Attorney, Agent, or Firm*—Kenyon & Kenyon LLP

(57) ABSTRACT

A method of encrypting data, a telecommunications terminal and an access authorization card are described, which permit utilization of services of one or more service providers independently of a network operator or manufacturer of the telecommunications terminal. Encrypted data is transmitted between a service provider and the telecommunications terminal over a telecommunications network. Data to be transmitted over the telecommunications network is encrypted as a function of the service provider selected.

16 Claims, 5 Drawing Sheets

METHOD FOR ENCRYPTING DATA AND A TELECOMMUNICATIONS TERMINAL AND ACCESS AUTHORIZATION CARD

FIELD OF THE INVENTION

The present invention relates to a method of encrypting data, a telecommunications terminal and an access authorization card.

BACKGROUND INFORMATION

In mobile wireless communications, for example, data may be transmitted between a service provider and a mobile telephone over a mobile wireless network, e.g., to load Internet email from the service provider into the mobile telephone. For example, a mobile wireless system according to the GSM standard (Global System for Mobile Communications) described in the publication "GSM Global System for Mobile Communication" J. Eberspacher, H. J. Vögel, B. G. Teubner, Stuttgart, 1997, wherein data to be transmitted over the mobile wireless network may be encrypted in a corresponding encryption unit and thus may be protected from unauthorized access. According to the GSM standard, the key with which the data to be transmitted is encrypted may be established by the mobile wireless system and thus by the network operator. Control of this key thus may lie with the network operator with which the mobile telephone is registered. The user may thus be unable to use the mobile telephone encryption functionality available in the mobile telephone independently of the network operator.

In addition, as described in the publication "Radio Interface Protocol Architecture," 3GPP TSG RAN WG2, TS25.301 v. 3.1.0, 1999, the encryption unit of the mobile telephone may be used to encrypt a device identifier of the mobile telephone and thus protect it from unauthorized access during its transmission to the mobile wireless network. However, this device identifier may be predetermined by the manufacturer of the mobile telephone. The user of the mobile telephone may thus be also unable to use the encryption functionality available in the mobile telephone independently of the manufacturer of the mobile telephone.

SUMMARY OF THE INVENTION

An exemplary method according to the present invention and an exemplary telecommunications terminal according to the present invention may encrypt data to be transmitted over the telecommunications network as a function of the service provider selected. In this manner, an encryption provided by the manufacturer of the telecommunications terminal or by the network operator of the telecommunications network may be superfluous, so that an encryption functionality of the telecommunications terminal may be operated independently of the network operator and almost independently of the manufacturer of the telecommunications terminal. In the encryption of data to be transmitted, one may no longer be required to rely on the issuance of keys by the network operator or the manufacturer of the telecommunications terminal. Thus, protection of data to be transmitted from unauthorized access may instead be in the hands of the service provider according to the present invention and the service user in the form of the telecommunications terminal and no longer may lie with the network operator or the manufacturer of the telecommunications terminal.

Data to be transmitted between the telecommunications terminal and the service provider may be encrypted over the complete transmission link, resulting in end-to-end data encryption between the telecommunications terminal and the service provider. Data to be sent to the service provider may not be decrypted by the network operator before reaching the service provider, so that it may not be transmitted completely to the service provider in a form in which it is not protected from unauthorized access.

Authentication of the telecommunications terminal may be provided directly at the service provider's location if the data to be transmitted includes a device identifier of the telecommunications terminal. Authentication thus may occur at the point where a decision is made regarding access of the telecommunications terminal to services of the service provider, namely at the service provider itself and not with the network operator, who may be upstream from the service provider and may have no decision authorization regarding access to the services of the service provider. Thus through the present invention, authentication of the telecommunications terminal may be provided directly at the service provider, and therefore it may be reliable. Conversely, the same may apply to authentication of the service provider at the telecommunications terminal.

On a basis of the present invention, the user of the telecommunications terminal may have an opportunity to utilize secured services of any desired service provider. The user may no longer be dependent on also using the network operator as the service provider or using service providers preferred by the network operator, but instead the user may make his own choice of services of any service provider without the knowledge of the network operator or the manufacturer.

Independently of the network operator and the manufacturer of the telecommunications terminal, secret keys may be issued which permit an unambiguous and reliable identification of the user of the telecommunications terminal and/or the service provider. This may permit secured authentication of the user of the telecommunications terminal at the service provider and authentication of the service provider at the telecommunications terminal without the network operator or the manufacturer of the telecommunications terminal having any influence on it. No additional encryption functionality may be required in the telecommunications terminal for this purpose.

Since the encryption functionality may be provided on an access authorization card, the encryption functionality may not be determined by the hardware of the telecommunications terminal but instead may be exchanged with the access authorization card. In this manner, new and improved encryption techniques and algorithms may be made available for the telecommunications terminal. By using the encryption functionality on the access authorization card, complete independence of the encryption of hardware and thus of the device manufacturer of the telecommunications terminal may be achieved, and in addition, an adapting to the rapidly increasing efficiency of microprocessors may also be utilized, if applied to the access authorization card. The access authorization card may be issued by the service provider to a user of the telecommunications terminal without involving the device manufacturer or the network operator. If in the course of time, integrated circuits and microprocessors become more efficient, then the service provider may simply give the user a new access authorization card having an improved encryption functionality. The user may then simply replace the access authorization card in his telecommunications terminal to access the improved functionality of the new access authorization card.

A service of the selected service provider may be used for transmitting data and data to be transmitted over the telecommunications network may be encrypted as a function of the selected service. In this manner, the transmission of data may be secured by individual services provided by a service provider by using a separate key for each. The number of secret keys used and thus the number of services that may be secured may be in principle unlimited.

The useful data to be transmitted may also be encrypted with the key selected for authentication of the telecommunications terminal. The number of keys to be stored in the telecommunications terminal and thus the storage space required may be reduced.

DETAILED DESCRIPTION

Figure 1:
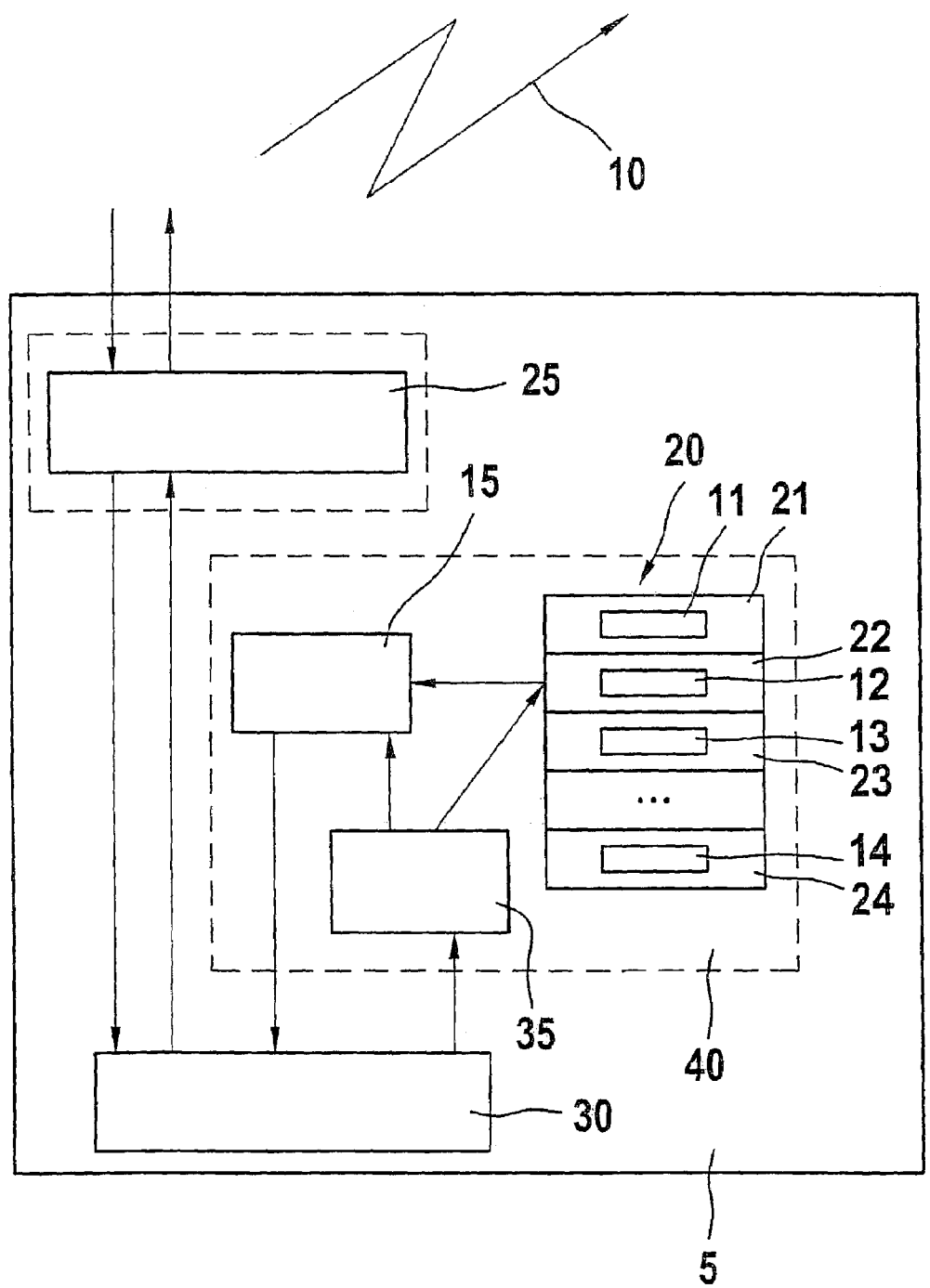
FIG. 1 shows a block diagram of a telecommunications terminal according to the present invention.

FIG. 1 shows a telecommunications terminal 5 which may be configured to have a cord or to be cordless or wireless. In the case of the telecommunications terminal configuration using a cord, it may be, for example, a telecommunications terminal according to the ISDN standard (Integrated Services Digital Network). The cordless telecommunications terminal configuration may be, for example, a telecommunications terminal according to the DECT standard (Digital European Cordless Telecommunications). The wireless telecommunications terminal design may be, for example, a telecommunications terminal according to the GSM standard (Global System for Mobile Communications) or according to the UMTS standard (Universal Mobile Telecommunications System). It is assumed below, for example, that telecommunications terminal 5 is configured as a wireless telecommunications terminal in the form of a mobile telephone according to the UMTS standard.

Mobile telephone 5 includes a first transmission device 25, which is to be configured below as a first transceiver device as an example. Mobile telephone 5 also includes a first application module 30 which is connected to first transceiver device 25. First application module 30 is in turn connected to an encryption module 40 which includes a first encryption unit 15. First encryption unit 15 is connected directly to first application module 30. Encryption module 40 also includes an address control 35 that is also connected directly to first application module 30. Encryption module 40 also includes a memory 20 having a first memory location 21, a second memory location 22, a third memory location 23 and an n-th memory location 24, where n is in general an integer and is equal to or greater than 1. In this example, n is equal to or greater than 4. A first key 11 is stored in first memory location 21. A second key 12 is stored in second memory location 22. A third key 13 is stored in third memory location 23. An n-th key 14 is stored in n-th memory location 24. Address control 35 is connected to memory 20 as well as to first encryption unit 15. Memory 20 is also connected to first encryption unit 15.

Figure 2:
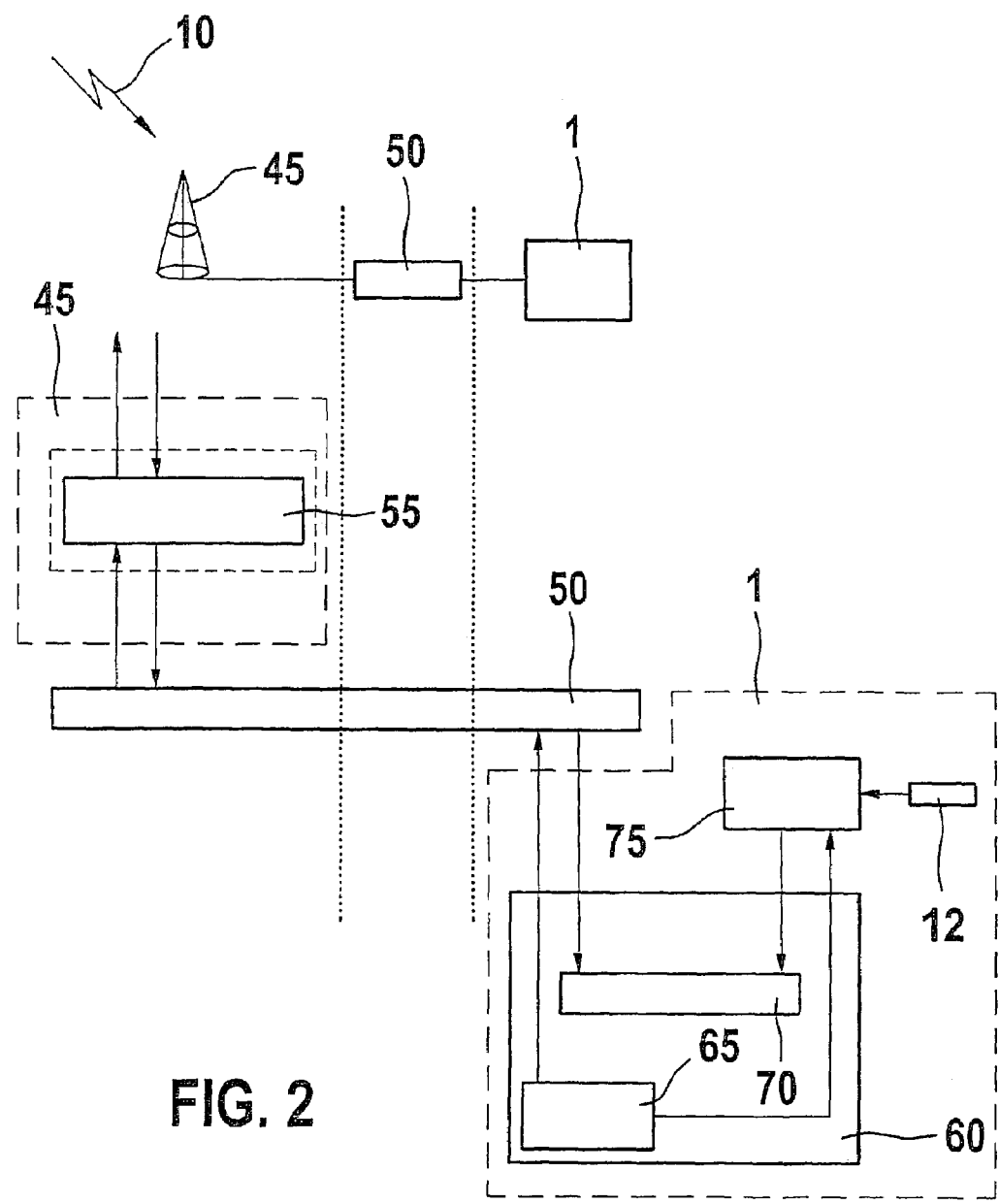
FIG. 2 shows a block diagram of a base station and a service provider connected to the base station via a gateway for the description of an authentication process.

Data may be exchanged over a telecommunications network 10, configured as a mobile wireless network in this example, between mobile telephone 5 and a base station 45 according to FIG. 2. According to FIG. 2, base station 45 is connected to a service provider 1 via a connecting unit 50, which is referred to below as a gateway. Service provider 1 may provide a wide variety of transmission services such as Internet email services, video transmission services, fax services or the like. Base station 45 includes a second transceiver device 55 connected to gateway 50. On the side of service provider 1, gateway 50 is connected to a second application module 60 which is allocated to service provider 1, is included by service provider 1, for example, and has arrangement 65 for generating an identification request. Arrangement 65 for generating an identification request is in turn connected directly to gateway 50 and also connected directly to a second encryption unit 75, which is also allocated to service provider 1 and is included by it, for example. Second application module 60 also includes a comparator 70 which is connected directly to gateway 50 and also directly to second encryption unit 75. Second encryption unit 75 also receives second key 12.

Data may be exchanged over mobile wireless network 10 between first transceiver device 25 and second transceiver device 55. In the following discussion, it is assumed as an example that mobile telephone 5 is attempting to establish a connection over mobile wireless network 10 and gateway 50 to service provider 1 in order to, for example, download Internet email from service provider 1 into mobile telephone 5. Therefore, there may be a contract between the user of mobile telephone 5 and service provider 1. According to this contract, use of the Internet email service provided by service provider 1 may be secured by a special key in order firstly to prevent an unauthorized telecommunications terminal from accessing this service provided by service provider 1 and secondly to prevent unauthorized access to data transmitted as part of the Internet email service between mobile telephone 5 and service provider 1. It is assumed below as an example that the key allocated in this manner to the Internet email service of service provider 1 is second key 12. If the connection to service provider 1 is initiated by mobile telephone 5, this may occur by the user of mobile telephone 5 dialing the number of service provider 1. Via this number, the user may have already dialed or selected a service of service provider 1. For access to the Internet email service of service provider 1, authentication of mobile telephone 5 at service provider 1 may be required first. Arrangement 65 therefore generates an identification request. The identification request is encrypted in second encryption unit 75 by using second key 12. In this manner, an encrypted reference response is formed and sent to comparator 70. On the other hand, the identification request from arrangement 65 is also sent to gateway 50 from whence it is delivered to second transceiver device 55 of base station 45 for emission over mobile wireless network 10 to mobile telephone 5. The identification request is then received in first transceiver device 25 and relayed from there to first application module 30. First application module 30 detects the identification request from the overall datastream received via first transceiver device 25 from mobile wireless network 10. It is known in first application module 30 under which address in memory 20 or in which memory location of memory 20 is stored a second key 12, which has been allocated to the Internet email service of service provider 1. In particular for the case when the request for a connection does not come from mobile telephone 5 but instead comes from service provider 1, the identification request may include a service provider identifier and the service offered by the service provider. First application module 30 then transmits the identification request that is detected together with this service provider identifier and the service offered by the service provider to address control 35. On the basis of this identifier, address control 35 is able to detect the initiating service provider and the service selected by it and to address the key allocated to this service provider and service in memory 20. Address control 35 then relays the identification request to first encryption unit 15 and addresses memory 20 according to the identifier thus analyzed. In the example described here, second memory location 22 is addressed with second key 12, which is allocated to the Internet email service offered by service provider 1. Second key 12 is then also transmitted to first encryption unit 15, which encrypts the identification request with second key 12 and thus forms an encrypted response. The encrypted response is transmitted from first encryption unit 15 to first application module 30 and from there to first transceiver device 25 for emission over mobile wireless network 10 to base station 45. The encrypted response is thus received in second transceiver device 55 and relayed from there over gateway 50 to comparator 70. In comparator 70, the encrypted response received by mobile telephone 5 is compared with the encrypted reference response formed in second encryption unit 75. Since the same encryption algorithm is used in first encryption unit 15 and second encryption unit 75, the same identification request with encryption using the same key also leads to the same encrypted response. Thus if the encrypted response received by mobile telephone 5 corresponds to the encrypted reference response in comparator 70, mobile telephone 5 is successfully authenticated at service provider 1 and is authorized for access to the Internet email service. Otherwise, the authentication has failed and mobile telephone 5 is not allowed access to the Internet email service.

After successful authentication of mobile telephone 5 at service provider 1, there may be an exchange of useful data between mobile telephone 5 and service provider 1 so that Internet email received at service provider 1 may be downloaded from service provider 1 into mobile telephone 5 by using the Internet email service for mobile telephone 5, for example. For exchange of useful data of the Internet email service between mobile telephone 5 and service provider 1, a useful data key may be agreed upon and used to encrypt the useful data to be sent between mobile telephone 5 and service provider 1 as part of the Internet email service, in particular the Internet email to be loaded itself, to secure it from unauthorized access during transmission. The useful data key may differ from the key required for authentication. However, to save on memory capacity, it may also be the same as the key used for authentication. Therefore, it shall be assumed in the following discussion as an example that the useful data key provided for the Internet email service of service provider 1 corresponds to second key 12. The useful data to be sent from mobile telephone 5 to service provider 1 as part of the Internet email service is then encrypted prior to transmission with second key 12 in the same manner as the identification request for the authentication process. Instead of delivering the identification request, first application module 30 delivers the useful data to be sent to service provider 1 over address control 35 to first encryption unit 15, where it is encrypted with second key 12 in the manner described above. The useful data thus encrypted is then transmitted to service provider 1 in the manner described here over first application module 30, first transceiver device 25, mobile wireless network 10, base station 45 and gateway 50.

Figure 3:
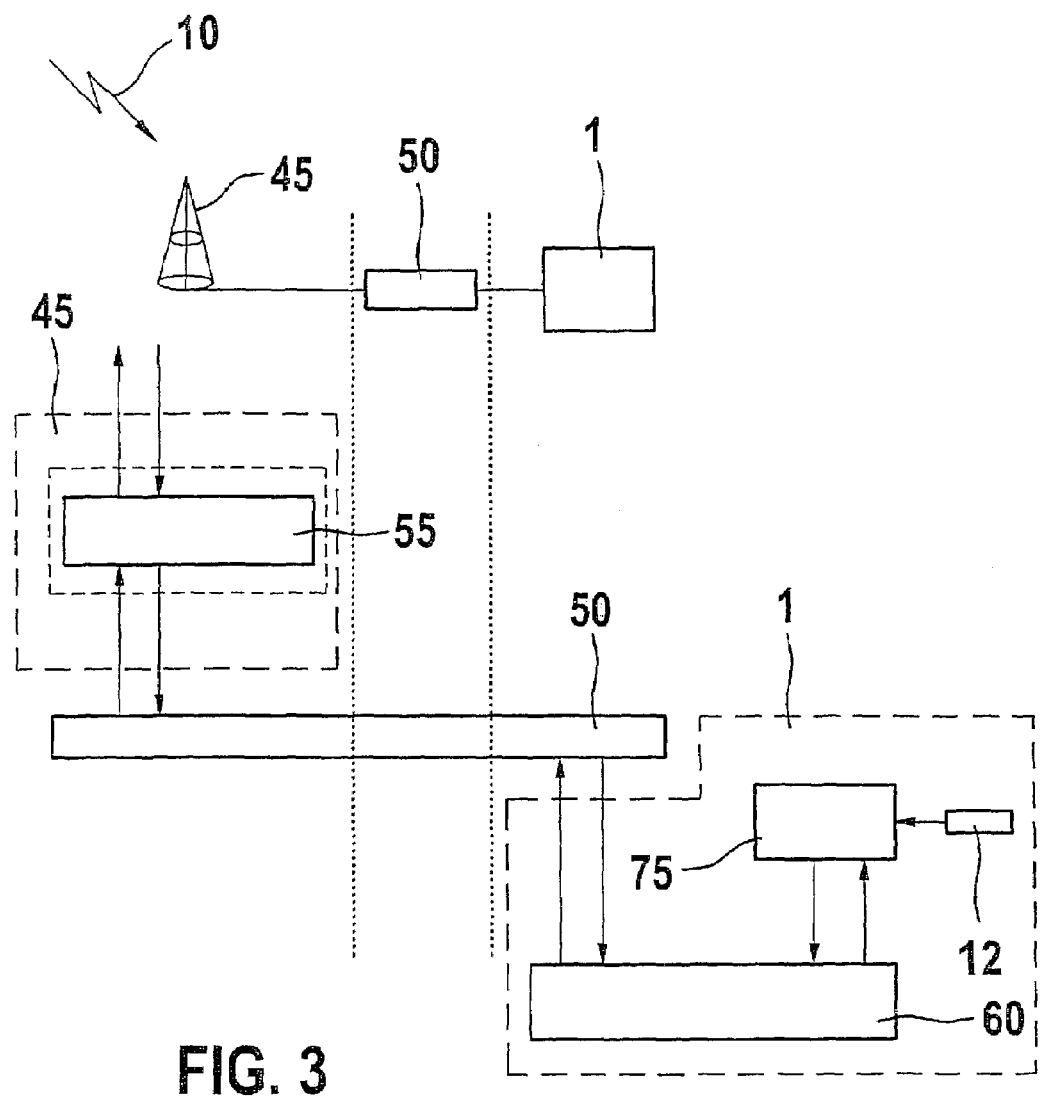
FIG. 3 shows a block diagram of a base station and a service provider connected to the base station via a gateway for an encrypted useful data transmission.

FIG. 3 shows a block diagram of base station 45, gateway 50 and service provider 1 in which the same reference numbers denote the same elements as in FIG. 2 and which differs from the block diagram in FIG. 2 only in that second application module 60 is shown in general without illustrating any other components. Arrangement 65, which may be required for authentication for generating the identification request and comparator 70 may be no longer required for the phase of useful data exchange between mobile telephone 5 and service provider 1 but they are still present as before. Second application module 60, however, now has the function of decrypting useful data received by mobile telephone 5 and sending the Internet email desired by mobile telephone 5 for encryption by second key 12 in second encryption unit 75 and thus delivering the Internet email thus encrypted over gateway 50 to second transceiver device 55 for emission over mobile wireless network 10 to mobile telephone 5. This Internet email is then received in first transceiver device 25 and is relayed to first application module 30 for decryption. Internet email transmitted in this manner is also corresponding useful data. Decryption of the useful data transmitted between mobile telephone 5 and service provider 1 occurs accordingly after receipt in respective application module 30, 60 by using a decryption algorithm which is allocated to the encryption algorithm of first encryption unit 15 and second encryption unit 75 and which reverses the encryption of data accomplished with the encryption algorithm and also uses second key 12 to implement this in a corresponding manner.

The present invention has been described as an example on the basis of service provider 1 selected by mobile telephone 5 and Internet email service of service provider 1 also selected by mobile telephone 5. Second key 12, for example, is allocated to this combination of selected service provider 1 and selected Internet email service. Similarly, mobile telephone 5 may also be able to access other services of service provider 1 such as a video transmission service or a fax service, each of which would in turn be allocated a separate key, e.g., first key 11 or third key 13. In this case, video data or fax data, for example, are transmitted as useful data between mobile telephone 5 and service provider 1. In addition, mobile telephone 5 may select one or more service providers different from service provider 1 to use different services. A key may be allocated to each combination of selected service provider and service used by the selected service provider in the manner described here for authentication and/or secure exchange of useful data. However, one or more of the key stored in memory 20 may each be allocated to only one service provider without a separate key being allocated to the individual services provided by these service providers. All the services of such a service provider may thus be utilized through the key allocated or assigned to this service provider, so that a separate user authorization may not be required for access to each of the various services of such a service provider, and a successful authentication for such a service provider may make all services offered by this service provider accessible to mobile telephone 5. The useful data may be transmitted between mobile telephone 5 and this service provider for the various services of this service provider to be encrypted independently of the service used by using the same useful data key, this useful data key optionally being, for example, the same key as that used for the authentication.

Memory 20 may be a nonvolatile flash/EEPROM, the content of which may not be lost even in a power failure.

In a modification of the exemplary embodiment described with respect to FIG. 1, the required key, namely second key 12 in this example, may be transferred from first application module 30 together with the identification request of first encryption unit 15 for encryption of the identification request via address control 35. First encryption unit 15 then generates an encrypted response in the manner described and sends it back to application module 30. However, if the keys are stored in memory 20, as illustrated in FIG. 1, which is integrated together with first encryption unit 15 in encryption module 40, then the keys may be better protected from unauthorized access, assuming that encryption module 40 is protected from unauthorized access.

Address control 35 forms an interface between first application module 30 and encryption module 40. In a modification of the exemplary embodiment illustrated in FIG. 1, it may optionally also be provided that the data encrypted by first encryption unit 15, such as the encrypted identification request or the encrypted useful data, is transmitted over address control 35 to first application module 30, to be transmitted from there to service provider 1 via first transceiver device 25, mobile wireless network 10, base station 45 and gateway 50. In the UMTS mobile wireless network, data may be transmitted between mobile telephone 5 and base station 45 over UMTS carriers.

With a suitable capacity of memory 20, an almost unlimited number of keys may be stored there and then may be used with any desired service of any desired service provider in the manner described without, for example, the first service provider selected for a first service being aware of the choice of a second service provider for a second service.

Figure 4:
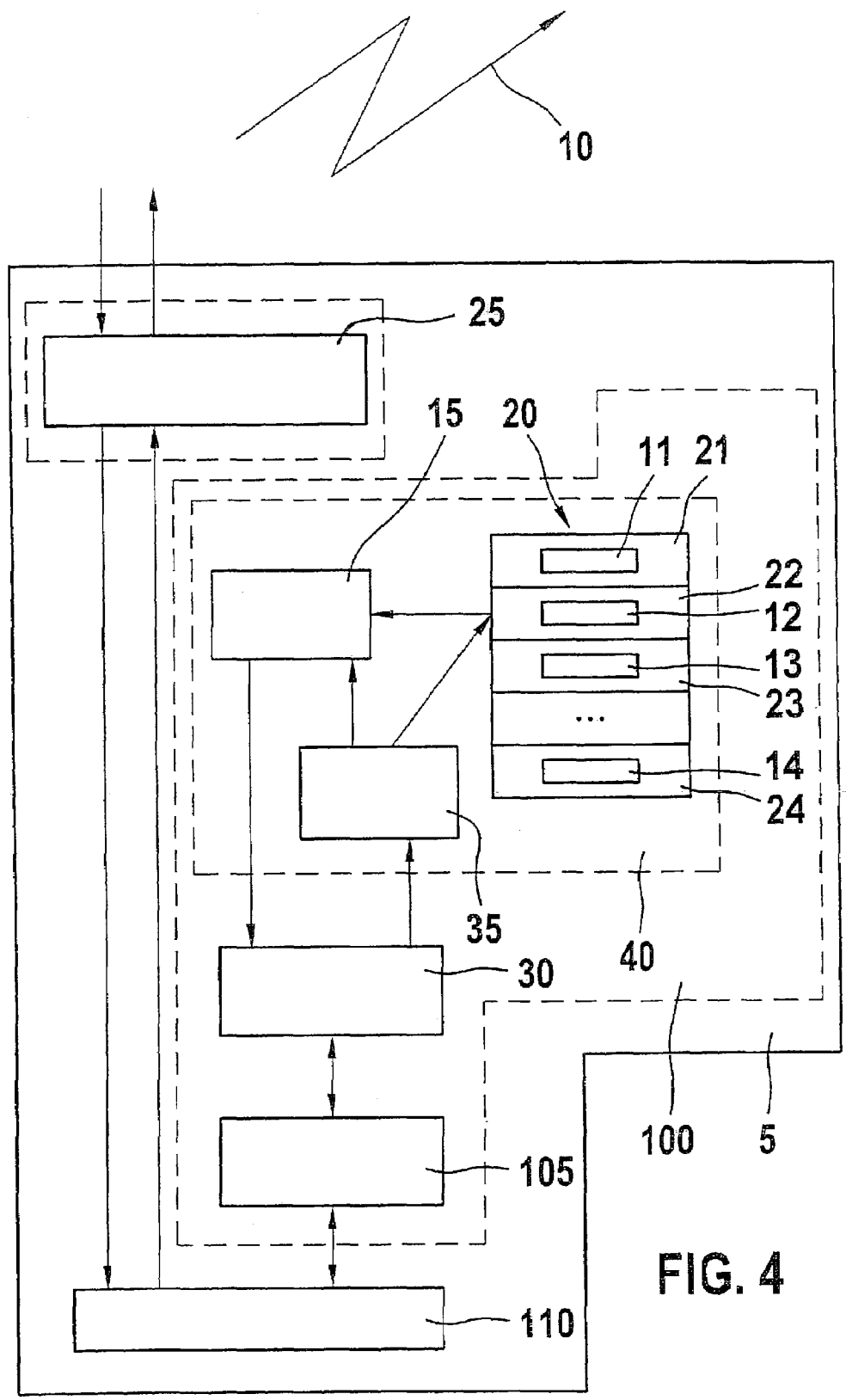
FIG. 4 shows a block diagram of a telecommunications terminal having an access authorization card according to the present invention inserted into it.

FIG. 4 shows as another exemplary embodiment an alternative embodiment of telecommunications terminal 5, where the same reference numbers characterize the same elements as in FIGS. 1 through 3. An access authorization card 100 is inserted into telecommunications terminal 5 via an input slot (not shown in FIG. 4). Encryption module 40 and first application module 30 are no longer parts of the telecommunications terminal itself in the exemplary embodiment according to FIG. 4, but instead are located on access authorization card 100. In addition, access authorization card 100 includes a first interface unit 105 which is connected to first application module 30 and is intended for connection to a second interface unit 110 of telecommunications terminal 5. Then first transceiver device 25 is connected to second interface unit 110.

The function of telecommunications terminal 5 illustrated in FIG. 4 with the access authorization card inserted corresponds to the function of the telecommunications terminal according to FIG. 1, except that in telecommunications terminal 5 according to FIG. 4, an interface circuit, which is formed from first interface unit 105 and second interface unit 110 and ensures a bidirectional data exchange between telecommunications terminal 5 and access authorization card 100, is situated between first transceiver device 25 and first application module 30.

It is assumed in the following as an example that access authorization card 100 is designed as a SIM card (subscriber identity module), e.g., in the form of a smart card, and that a common protocol, hereinafter referred to, for example, as the SAT protocol (SIM Application Toolkit), is used for bidirectional transmission between access authorization card 100 and service provider 1. Smart cards may include a small chip having an integrated microprocessor and an interface for data exchange and may be used by banks on money cards, for example. The SAT protocol is described, for example, in the publication "Specification of SIM Application Toolkit for the Subscriber Identity Module—Mobile Equipment (SIM-ME) Interface," GSM 11.14 version 8.0.1 release 1999, ETSI.

Figure 5:
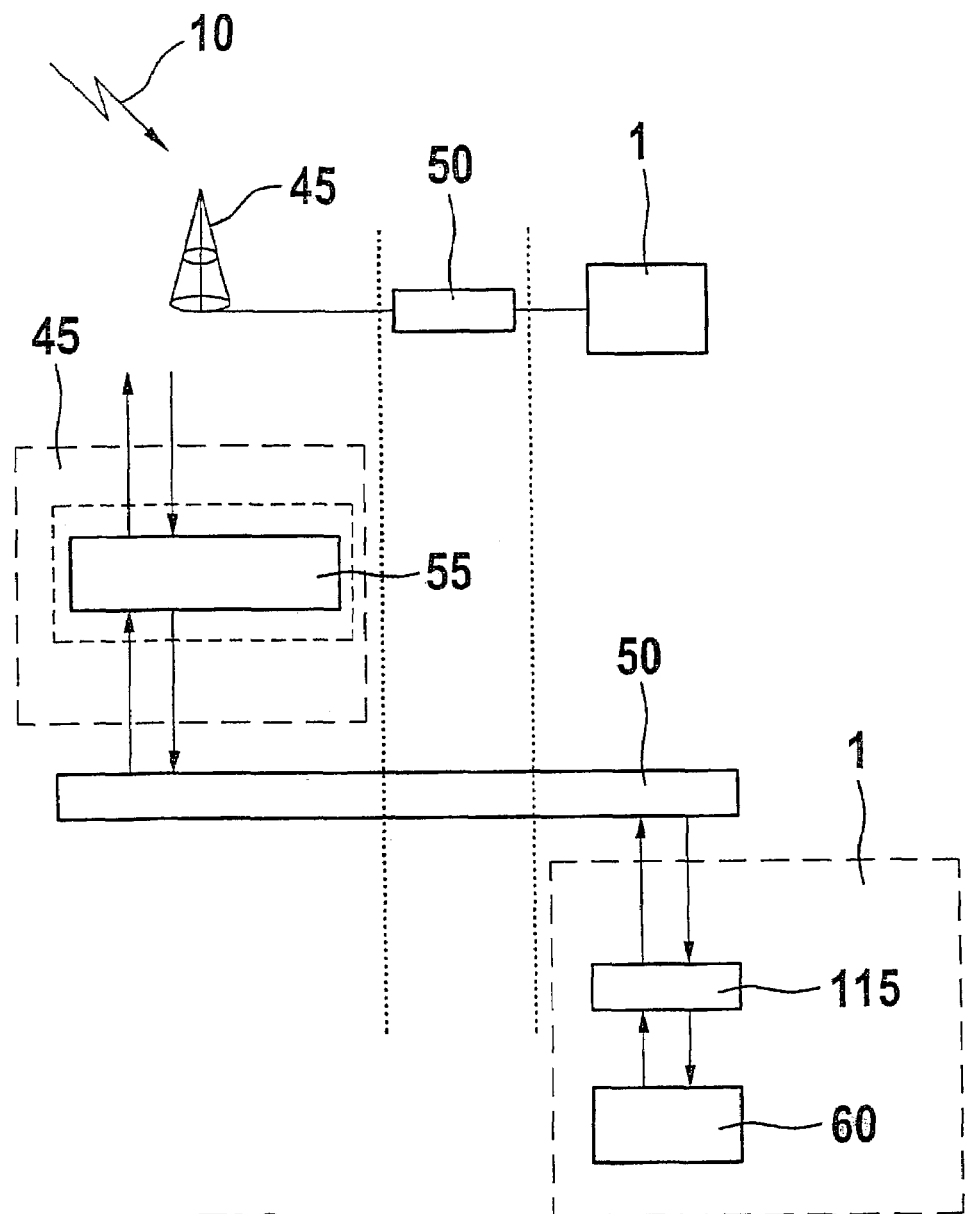
FIG. 5 shows a block diagram of a base station and a service provider connected to the base station via a gateway, having a protocol unit for exchanging data with the access authorization card inserted into the telecommunications terminal.

In this case, according to FIG. 5, an interface circuit in the form of a third interface unit 115 is also provided at service provider 1 and is connected between second application module 60 and gateway 50 and in this example is also to be implemented according to the SAT protocol. Other modules of service provider 1 such as those illustrated in FIGS. 2 and 3, for example, are not shown in FIG. 5 for the sake of simplicity.

A user who would like to use a service of service provider 1 receives from the service provider access authorization card 100 on which service provider 1 has stored one or more of secret keys 11, 12, 13, 14 in memory 20. This key or these keys may then function as a secure arrangement for mutual identification of the two contractual partners during the term of the contract between the user and service provider 1.

Telecommunications terminal 5 may be configured as a UMTS mobile wireless device, for example. If the user wants to use a service of service provider 1, he may request this service over telecommunications network 10, which is configured as a UMTS mobile wireless network in this example, by dialing the telephone number of service provider 1, for example. Then service provider 1 generates the identification request, as described, and sends it over UMTS mobile wireless network 10 to UMTS mobile wireless terminal 5. At the same time, service provider 1 generates the encrypted reference response as described previously. The entire course corresponds to that described above with respect to FIGS. 1 through 3, except that service provider 1 sends the identification request to UMTS mobile wireless device 5 over third interface unit 115 by using the SAT protocol. The identification request is packaged in third interface unit 115 with the help of the SAT protocol, signaling information, which is implemented as header information, for example, also being sent together with the identification request, indicating to first transceiver device 25 of UMTS mobile wireless device 5 on receipt that the received data is to be relayed with the identification request to second interface unit 110 in UMTS mobile wireless device 5. Data is then sent from second interface unit 110 together with the identification request over first interface unit 105 to first application module 30 in access authorization card 100. The first application module then extracts the identification request, optionally together with the address of a memory location for the stipulated key in memory 20, out of the data received by first interface unit 105 in the manner described above. Encryption module 40 then forms the encrypted response in the manner described above, and this response is transmitted by first application module 30 to first interface unit 105, where the encrypted response is again packaged using the SAT protocol and relayed to second interface unit 110, from where it is sent back to service provider 1 via first transceiver device 25 using a UMTS carrier over UMTS mobile wireless network 10.

In third interface unit 115, the received encrypted response is unpackaged again according to the SAT protocol and compared with the encrypted reference response in the manner described above for the purpose of authentication.

If it is desirable to perform authentication as described not only before the beginning of transmission of useful data but additionally to protect the entire useful data transmission from unauthorized access such as interception, then according to an exemplary embodiment and/or exemplary method of the present invention, end-to-end useful data encryption may also be implemented as described between service provider 1 and access authorization card 100 of UMTS mobile wireless device 5. This end-to-end useful data encryption may also be implemented in the manner described here on the SAT protocol using first interface unit 105 and second interface unit 110. The useful data encryption performed by access authorization card 100 may thus be also completely independent of the network operator, the manufacturer of the UMTS mobile wireless device 5 and the encryption capabilities of UMTS mobile wireless device 5 itself.

As in authentication, the user may, on acquisition of access authorization card 100, agree with service provider 1 on a secret key which may, but need not, correspond to the key used for authentication. This key may even vary from one service to the next, because memory 20 makes available multiple memory locations 21, 22, 23, 24 for secret keys.

This means that various secret keys may be agreed upon between the user and service provider 1 for various services, the authentication described here being only one of them.

In using the SAT protocol, the protocol may be standardized and may have already been implemented in many mobile wireless devices, in particular those designed according to the GSM standard, and thus it may be widely available. The SAT protocol may offer an opportunity to access a manufacturer-independent interface between the respective mobile wireless device and access authorization card 100, thus may allow service provider 1 to implement new applications and thus may promote the distribution of these applications and the differentiation of service providers with respect to network operators and/or other service providers.

What is claimed is:

1. A method of encrypting data to be transmitted between a selected service provider and a telecommunications terminal over a telecommunications network, the method comprising:
    encrypting the data to be transmitted over the telecommunications network as a function of the selected service provider;
    sending an identification request from the service provider to the telecommunications terminal before transmission of data between the telecommunications terminal and the selected service provider, the identification request requesting that a key that is allocated to the selected service provider be selected from a plurality of keys stored in one of the telecommunications terminal and an access authorization card inserted into the telecommunications terminal;
    encrypting the identification request using a selected key to yield an encrypted response; and
    transmitting the encrypted response from the telecommunications terminal to the selected service provider for authentication of the telecommunications terminal;
    wherein the data to be transmitted is encrypted using the selected key for encrypting the identification request for authenticating the telecommunications terminal.

2. The method according to claim 1, further comprising:
    encrypting the data to be transmitted as a function of a selected service of the selected service provider used to transmit the data.

3. The method according to claim 2, further comprising:
    allocating a data key to the selected service and the selected service provided for encrypting the data to be transmitted.

4. The method according to claim 1, further comprising:
    allocating a data key to the selected service provider for encrypting the data to be transmitted.

5. A telecommunications terminal for exchanging data with a service provider over a telecommunications network, comprising:
    an encryption unit for encrypting data to be transmitted to the service provider;
    a memory for storing at least one key allocated to the service provider; and
    a transmitting device for sending an encrypted response to the service provider for authentication of the telecommunications terminal, wherein the encryption unit generates the encrypted response by encrypting an identification request received from the service provider using the at least one key allocated to the service provider;
    wherein the data to be transmitted is encrypted using the at least one key for encrypting the identification request.

6. The telecommunications terminal according to claim 5, wherein the at least one key is also allocated to a service via which the data is transmitted between the telecommunications terminal and the service provider.

7. The telecommunications terminal according to claim 5, wherein the at least one key used to generate the encrypted response is also allocated to a selected service for data transmission.

8. The telecommunications terminal according to one of claim 5, wherein the at least one key allocated to the service provider is a data key allocated to the service provider, and wherein the encryption unit encrypts the data to be transmitted using the data key.

9. The telecommunications terminal according to claim 8, wherein the data key is allocated to the service provider and also to a selected service.

10. The telecommunications terminal according to claim 5, wherein the encryption unit and the memory are arranged in the telecommunications terminal.

11. The telecommunications terminal according to claim 5, further comprising:
    an input slot for inserting an access authorization card, wherein the access authorization card includes the encryption unit and the memory; and
    an interface unit for exchanging encrypted data with the access authorization card.

12. An access authorization card for use in transmission of data between a service provided and a telecommunications terminal over a telecommunications network, comprising:
    a memory for storing at least one key allocated to the service provider;
    an encryption unit for encrypting the data to be transmitted to the service provider using the at least one key allocated to the service provider, wherein the encryption unit also generates an encrypted response for authentication of the telecommunications terminal, the encrypted response being generated by encrypting an identification request received from the service provider using the at least one key allocated to the service provider, and wherein the encrypted response is sent to the service provider for authentication of the telecommunications terminal via a transmitting device of the telecommunications terminal; and an interface unit for exchanging the encrypted data with the telecommunications terminal.

13. The access authorization card according to claim 12, wherein the at least one key is also allocated to a service via which the data is transmitted between the telecommunications terminal and the service provider.

14. The access authorization card according to claim 13, wherein the at least one key is allocated to the service provider and also to a selected service for data transmission.

15. The access authorization card according to claim 12, wherein the at least one key allocated to the service provider is a data key allocated to the service provider, and wherein the encryption unit is configured to encrypt data to be transmitted using the data key.

16. The access authorization card according to claim 15, wherein the data key is additionally allocated to a selected service.

* * * * *